(12) United States Patent
Crawley et al.

(10) Patent No.: US 6,193,029 B1
(45) Date of Patent: Feb. 27, 2001

(54) DAMPER AND VALVE

(75) Inventors: Edward F. Crawley, Cambridge; Kenneth B. Lazarus, Concord; Jeffrey W. Moore, Arlington; Douglas A. Simpson, Cambridge; Gerald F. Caron, Andover; Farla M. Russo, Cambridge, all of MA (US)

(73) Assignee: Active Control eXperts, Inc., Cambridge, MA (US)

( * ) Notice: Subject to any disclaimer, the term of this patent is extended or adjusted under 35 U.S.C. 154(b) by 0 days.

(21) Appl. No.: 08/890,955

(22) Filed: Jul. 8, 1997

(51) Int. Cl.[7] ............................................. F16F 9/32

(52) U.S. Cl. ............................................. 188/266.7

(58) Field of Search ............................... 188/266.6, 315, 188/366.7, 266.2, 266.7, 266.5, 322.13, 314, 267

(56) References Cited

U.S. PATENT DOCUMENTS

| 4,807,860 | 2/1989 | Simons . | |
|---|---|---|---|
| 4,961,483 | * 10/1990 | Yamaoka et al. | 188/266.7 |
| 5,154,263 | * 10/1992 | Lizell | 188/266.2 |
| 5,186,481 | 2/1993 | Turner . | |
| 5,193,833 | 3/1993 | Reisinger . | |
| 5,195,766 | 3/1993 | Dohrmann et al. . | |
| 5,233,834 | * 8/1993 | Tsukamoto | 60/545 |

(List continued on next page.)

FOREIGN PATENT DOCUMENTS

| 38 07 322 | 7/1989 | (DE) . |
| 0 411 337 | 2/1991 | (EP) . |

(List continued on next page.)

OTHER PUBLICATIONS

Noleen, "The Shocking Truth", Product Brochure, (3 pgs.).

*Primary Examiner*—Robert J. Oberleitner
*Assistant Examiner*—Melanie Talavera
(74) *Attorney, Agent, or Firm*—Testa Hurwitz & Thibeault LLP

(57) ABSTRACT

A valve regulates fluid displacement in a damper assembly, for example, displacement of hydraulic fluid in a sealed shock absorber. The valve is placed between a portion of fluid at one pressure and regulates the passage of fluid through an aperture or passage to a portion of fluid at a lower pressure by a blocking member which moves to obstruct the aperture in accordance with a desired level of damping. The blocking member is, or is driven by, an electroactive device, such as a bimorph actuator formed of ferroelectric material. In one embodiment, the blocking member is a bimorph which covers the aperture, and is flexibly displaced by passage of pressurized fluid through the aperture. A controller provides an electrical actuation signal to move the bimorph toward or away from the aperture, augmenting or decreasing its closing bias to affect both the threshold flow initiation pressure and the rate of flow once the passage opens. Preferably the blocking member is a flexible piezoelectric assembly, which moves across a gap to provide a varying obstruction in the near field of fluid flow as the fluid moves through the passage. Piezobenders, washers and various pinned or cantilevered constructions of electroactive elements are adapted to different passage geometries. The valve assembly may be implemented in a plenum that attaches between chambers of a fluid housing, and include a first passage leading to one side, illustratively the high pressure side, of the damping piston, and a second passage connecting to the other, e.g., low pressure side of the piston. A piezo bender covers an elongated opening between the first and second passages and a controller moves the bender toward or away from the opening to reduce or increase flow. Preferably, a position sensor connected to the controller senses piston position, and the controller operates to energize the bender and to obstruct the opening or to further restrict flow if the piston position or its velocity is determined to lie above a threshold.

29 Claims, 7 Drawing Sheets

U.S. PATENT DOCUMENTS

| | | | |
|---|---|---|---|
| 5,269,549 | 12/1993 | Wilson et al. | |
| 5,276,622 * | 1/1994 | Miller et al. | 701/37 |
| 5,284,352 | 2/1994 | Chen | 280/276 |
| 5,310,203 | 5/1994 | Chen | 280/276 |
| 5,361,209 | 11/1994 | Tsutsumi | 364/424.05 |
| 5,454,452 * | 10/1995 | Ohlin | 188/266.5 |
| 5,456,480 | 10/1995 | Turner et al. | 280/276 |
| 5,580,075 | 12/1996 | Turner et al. | 280/276 |
| 5,996,745 * | 12/1999 | Jones, Jr. et al. | 188/266.7 |
| B1 4,971,344 | 3/1992 | Turner. | |

FOREIGN PATENT DOCUMENTS

| | | | |
|---|---|---|---|
| 0 654 618 | 5/1995 | (EP) | F16F/9/34 |
| 356.042 | 11/1905 | (FR). | |
| 2 692 016 | 12/1993 | (FR) | F16F/9/52 |
| 63-303238 | 12/1988 | (JP). | |
| 03239829 | 10/1991 | (JP) | F16F/9/46 |
| 92/10693 | 6/1992 | (WO) | F16F/9/50 |
| 95/20827 | 8/1995 | (WO) | H01L/41/08 |

\* cited by examiner

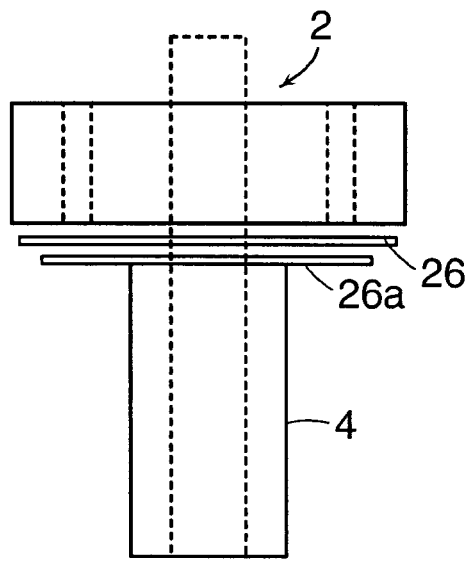
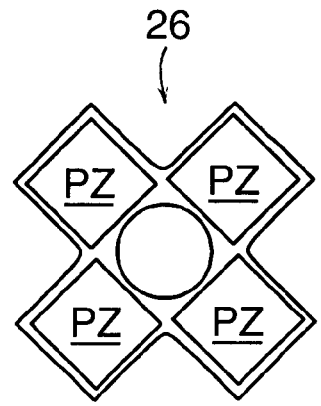
FIG. 3A
FIG. 3B
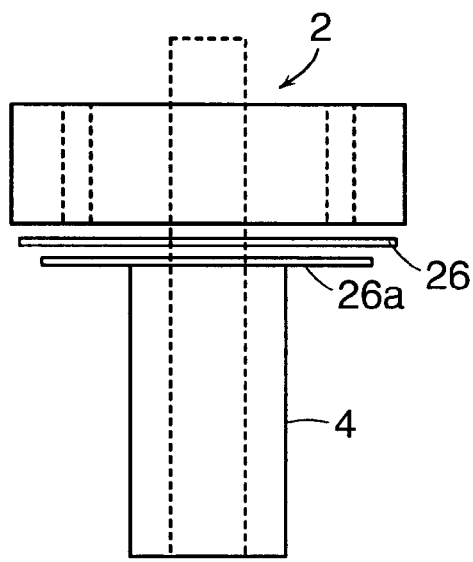
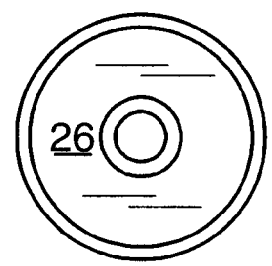
FIG. 4A
FIG. 4B

CLAMPED-FREE

PINNED-PINNED  - INITIALLY FLAT

CLAMPED-PINNED

CLAMPED-SLIDING

PINNED-PINNED - INITALLY CURVED

DAMPER AND VALVE

BACKGROUND

The present invention relates to a fluid valve, and more particularly to a valve having different, or variable, settings for affecting flow of a fluid. In a preferred embodiment it relates to a fluid valve for damping a hydraulic assembly.

A number of devices in the prior art employ hydraulic or fluidic dampers or dashpots to smooth out mechanical motion or jitter. Vehicle shock absorbers are one example of such devices, and substantially similar devices are used for office chairs, door closers, and other applications. In several of these applications the device is subject to asymmetrical impulse actuations, or operates in a range of motion about a set point offset from its center. For example, a vehicle shock absorber may be subject to upward impulses in which energy is delivered in larger amounts, or during shorter time intervals, than the gravity- and spring-driven downward return movements.

Conceptually, a vehicle suspension generally includes a spring and a fluid damper. The spring elastically stores and returns the energy of up-and-down motion of a mechanical assembly such as the hub driving the wheel to smooth the sharp impacts caused by running over irregularities in the roadway and restore the suspension to a neutral position, while the damper dissipates a portion of the energy in each stroke or cycle to prevent resonant oscillations from arising. Energy dissipation is achieved by introducing frictional losses. This may be done by arranging that a piston connected to the suspension displaces hydraulic fluid through a flow impediment, e.g., one or more small orifices that introduce turbulence, drag. viscous shear or other lossy events in the fluid, which may for example be a liquid or a high pressure gas.

Practical implementation of such a mechanical damper entails considerations of the expected frequency and shape of displacement impulses, vehicle mass, the desired range of motion of the suspension, and the required strength and allowable weight of the damper assembly. For automobiles, suitable shock absorbers are achieved with piston-type assemblies located at each wheel, and each weighing two to ten kilograms, with a piston travel of about five to thirty centimeters. Smaller assemblies may be used on mechanisms such as steering arms or tailgate assemblies, while even larger ones may be necessary to accommodate heavy loads or driving on rough roadway surfaces.

When an assembly of this type is to be used for a mountain bicycle, weight is a primary consideration since the total vehicle weight must be pedaled by the user. Furthermore, the vehicle handling is strongly affected by the characteristics of the damper. The front suspension, e.g. a telescoping fork, is the steering mechanism, and impacts on the rear wheel may pass fairly directly to the seat, so both the comfort and actual steering aspects of handling are affected.

One known bicycle shock absorber employs a piston that displaces fluid within a hydraulically full and sealed cylinder. The piston has a number of passages extending between one side and the other, and each passage has a flexible washer fastened over one end to act as a one-way flap valve allowing flow in only the forward, or only the reverse direction. The number and sizes of these passages are configured to resist fluid displacement and thus control movement of the piston when the bicycle is subjected to changing terrain and impact. This construction is structurally strong and mechanically robust. However, because of the extreme range of conditions which a bicycle may experience, these shocks cannot operate optimally under some combinations of diverse conditions. When the passages are sized to resist flow of hydraulic fluid only weakly, a smoother or "soft" ride is obtained, but a large force will cause the shock to quickly "bottom out" and become ineffective. On the other hand, if the passages are configured to inhibit flow so much that the shock absorber never bottoms out under conditions of energetic impact, then the shock absorber provides a "hard" ride, greatly reducing comfort. It is generally desirable to have a stiff suspension during pedaling, so that energy of pedaling is not lost to the suspension. However, between periods of pedaling, when there are moderate impacts, a softer ride is needed.

Accordingly, if would be advantageous to provide a flow valve having different characteristics suitable for controlling a range of expected flows occurring over a wide range of driving conditions.

It would be further advantageous to provide a flow valve with variable flow control or regulation characteristics which change to match existing conditions.

SUMMARY OF THE INVENTION

This is achieved in accordance with the present invention by providing a valve to regulate fluid displacement, for example of hydraulic fluid in a sealed shock absorber, wherein the valve is placed between a portion of the fluid at one pressure and controls fluid flow as the fluid is driven along a passage to a portion of fluid at a lower pressure. An aperture constitutes or communicates with the passage, and a blocking member is moved to obstruct the aperture in accordance with a desired level of damping. An electroactive device, such as an actuator formed of ferroelectric material, is actuated to position the blocking member.

In one embodiment, the blocking member is a bimorph which covers the aperture. The bimorph is deflected by passage of fluid through the aperture, and a controller provides an electrical activation signal to drive the bimorph toward or away from the aperture, augmenting or decreasing its closing bias. This affects both the threshold flow initiation pressure and the degree of flow permitted once the passage is opened. In other embodiments the aperture or passage may be a slot-like channel, with the blocking member positioned in the slot like a flap or reed. Actuation of the member bends it into the stream to affect flow. In other embodiments the passage may feed to a groove formed in a plate surface, and the blocking member covers the groove. Preferably the blocking member is a flexible piezoelectric assembly, which moves across a gap to provide a varying obstruction in the near field of fluid flow as the fluid moves through the passage. Piezobenders, washers and various pinned or cantilevered constructions adapt to different passage geometries.

In a presently preferred embodiment, a plenum attaches to a damper housing, and includes a first passage leading to one side, illustratively the top or high pressure side, of the damping piston, and a second passage connecting to the other, e.g., bottom or return pressure side of the piston. A piezo bender covers an elongated opening between the first and second passages and a controller moves the bender toward or away from the opening to reduce or increase flow along the first passage into the second passage. A position sensor connected to the controller senses piston position, and the controller operates to energize the bender and to obstruct the opening or further restrict flow if the piston position or velocity is determined to lie above a threshold. This extends the useful range of the damper and may allow optimal stroke of the damper during all conditions of use, enhancing comfort while preventing bottoming out and unnecessary loss of rider energy. Other passages with fixed one-way valves in each direction may be provided to tailor the general damping characteristics of the damper.

BRIEF DESCRIPTION OF THE DRAWINGS

These and other features of the invention will be understood from the description herein, together with illustrative drawings, wherein:

FIGS. 3A and 3B illustrate details of a fourth embodiment of the invention;

FIGS. 4A and 4B illustrate details of a further embodiment of the invention.

DETAILED DESCRIPTION

Figure 1:
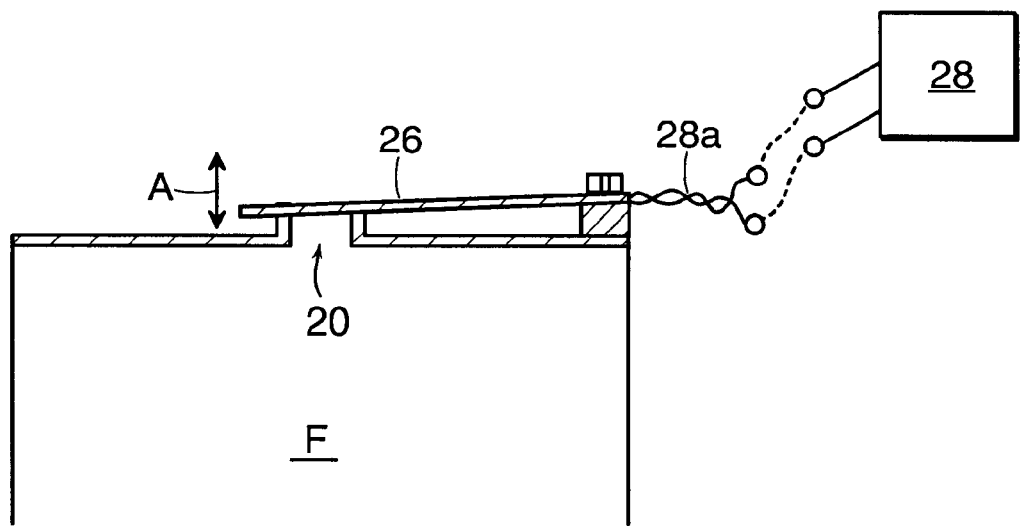
FIG. 1 shows a partly schematic cross-sectional view of a first embodiment of the invention.

FIG. 1 shows a basic embodiment of the invention wherein a system or device includes a body of fluid F at a first pressure that is driven through a passage 20 and controlled by a deformable flow restrictor 26 responsive to electrical control signals from a controller 28. In this embodiment, the deformable flow restrictor 26 is a plate-like member, cantilevered across the passage 20 to block the opening with a varying degree of obstruction. For example, the plate 26 may be an encapsulated piezoelectric sheet, e.g., a two-layer piezo bender made in accordance with the teachings of commonly-owned published International Patent application WO95/20827, and clamped over the passage in the manner of a valve as described, for example, in commonly owned U.S. patent application Ser. No. 08/760,607 filed Dec. 4, 1996. Each of those documents is incorporated herein by reference for their descriptions of methods of fabricating such piezoelectric plate devices . As relevant here, the plate 26 is mounted to exert a downward (as illustrated) force over the passage 20, for example in the range of 0.1 to 1.0 pounds, and to be pushed open and deflected along the direction of arrow "A" by the fluid pressure. The controller 28 applies a voltage across the plate to cause it to bend toward or away from the opening. For example a voltage of fifty to two hundred volts may be applied, with the polarity selected to augment or diminish the closing bias of the plate over the passage.

Figure 1B:
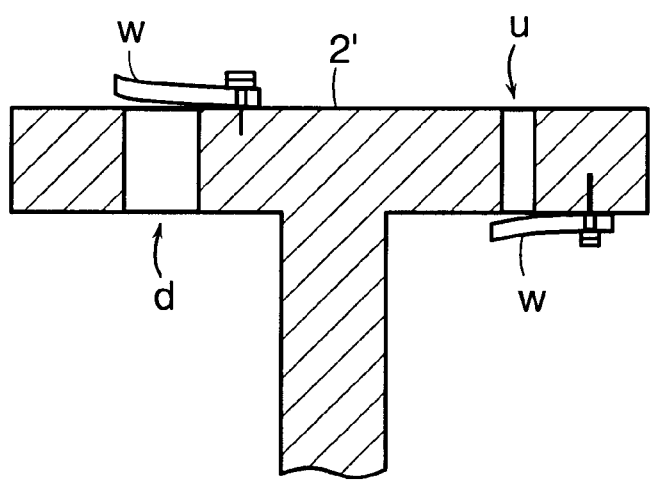
FIG. 1B shows prior art fixed damper elements which may be used in the embodiment of FIG. 1A.
Figure 1A:
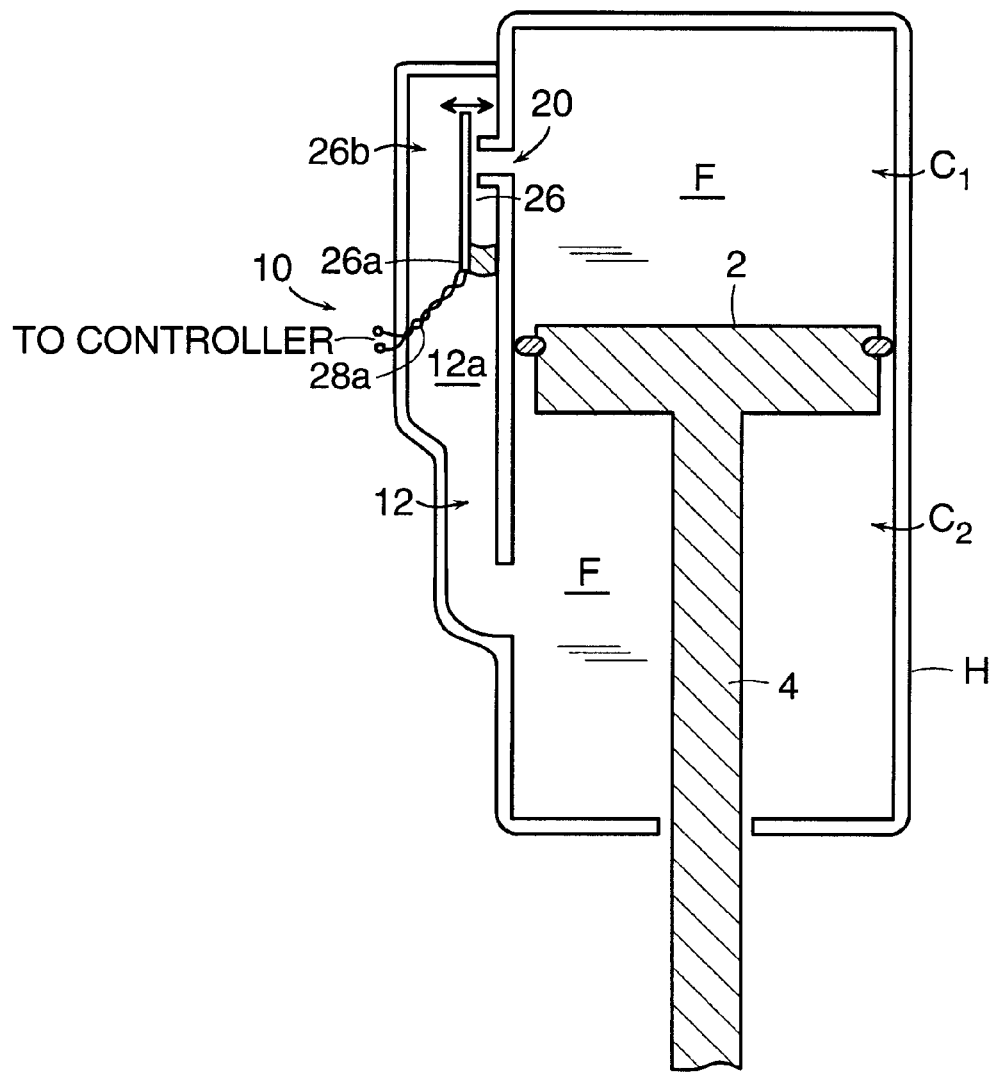
FIG. 1A shows a similar view of a second embodiment.

FIG. 1A illustrates generally these basic elements of the flow controller in a damper in accordance with the present invention. As shown schematically in cross section, a piston 2 is displaced within a housing H filled with fluid F, dividing it into two chambers C$_1$ and C$_2$. The piston seals against walls of the chambers, and the housing is hydraulically full, so movement of the piston in the direction of one chamber forces fluid to the other chamber, for which purpose a fluid return assembly 10 including a return passage 12 is provided. Thus motion of the piston along the direction of the axis of its shaft 4 shifts the relative sizes of the chambers C$_1$, C$_2$ and moves fluid therebetween through the assembly 10. More generally, the displacing body or source of fluid-driving pressure may reside entirely separate from the assembly 10, and be connected by a conduit. For the illustrated structure, in a practical implementation, the other end of the piston shaft may connect, as is well understood, to the structure or assembly which is to be damped, for example to a wheel axle or front fork of a bicycle. As shown schematically, fluid communication between the two sides of the piston is effected by passage indicated generally by 12, which communicates with a space 12a enclosing a bypass opening 20 leading from chamber C1, via a blocking member 26 positioned over the opening 20. Fluid pressure drives the member 26 upward, opening the aperture 20. The resistance to flow presented by the aperture 20, blocking member 26, and passage 12, together, serves to limit the rate of fluid displacement, hence the rate and the amount which piston 2 may travel, when the piston is subjected to an impulse. Furthermore, as illustrated, the blocking member 26 is suspended over aperture 20, so that when the piston 2 moves downward to increase fluid pressure in chamber C2, force on member 26 drives it closed, in the manner of a reed or flap. The valve therefore operates unidirectionally to allow flow only from C1 to C2.

Other mechanisms known in the art and not illustrated in FIG. 1 may be provided to allow damped flow from C2 to C1, and further mechanisms of reverse orientation to provide additional damped flow passages from C1 to C2 may be provided, so that hydraulic assembly operates as a basic bidirectional damping assembly. Such other mechanisms may include fixed one-way openings running directly through the piston head with valved endings to allow flow in one or both directions, as is known. Such fixed, one-way flow restriction passages are shown in a piston 2' in FIG. 1B. One passage u opens directly through the piston head and has a flexible washer w positioned beneath it to flex open when upward pressure on the piston raises the pressure in the upper chamber and drives fluid downwardly. A second, illustratively larger, through passage d has a flexible washer over its top end, and provides a generally softer restriction or larger flow allowing damped flow during downward motion of the piston. Additional prior art fixed damping passages of this type may be provided in the piston 2 of FIG. 1A.

Returning to FIG. 1A, the blocking member 26 is suspended with a fixed mounting portion 26a fastened to the housing, and positioned to have a free end 26b covering the aperture 20. Control leads 28a extend from the blocking member to a control unit, not shown, which provides electrical control signals to regulate the member 26 and control its damping characteristics as described in more detail below. In this embodiment, the member 26 is a cantilevered sheet, such as a piezobender or other electrically actuated bimorph, and actuation of the bimorph increases or decreases the force with which it biases the aperture 20 closed, and correspondingly decreases or increases its displacement, respectively, away from the opening when it is driven open under the influence of fluid pressure exiting the aperture.

In the prior art construction of FIG. 1B, the piston 2' moves bidirectionally within a cylindrical housing to displace fluid, and a plurality of passages are formed directly through the piston head to control the rate of displacement. Generally a first set of passages includes several of the passages u open to the upper face of the piston, which have their lower ends obstructed by a flexible washer or a flap w, so that when pressure above the piston exceeds the pressure below by a certain amount, fluid may deflect the washer and pass through the passages. A second set includes several of the apertures denoted d, which are illustratively of larger size or may have a more easily displaced flex flap or washer w, to allow flow in the reverse direction when the piston is pushed downwardly by the return spring. Advantageously, the damper of FIG. 1A, or of FIG. 2 discussed below, may incorporate a piston of this prior art construction. In that case, the apertures may be made smaller or more obstructed than usual, to provide a generally harder of stiffer ride. The piezo-controlled aperture 20 (FIG. 1A) then functions as an addition flow path, or bypass valve, which allows the shock absorber to have significantly more extended range, and either an automated or user-set electric selection of its range or characteristics.

In FIG. 1A, the housing H and piston 2 are shown in a generally vertical orientation, resulting in upper and lower chambers, and the return or bypass assembly is located lateral to the principal chambers. Since the housing and bypass are hydraulically full, actual physical orientation of the assembly is substantially irrelevant to its structure and operation, and it will be understood that the damping assembly may reside horizontally, or obliquely, such as, for example, when connected between cross-members of an articulated frame or suspension. However, to provide a uniform vocabulary for referring to the opposed chambers, these will be referred to simply as "upper" and "lower" chambers, and these terms will be used to describe the corresponding portions of the housing and passages from the chambers. However despite the non-directionality of the damper in this sense, one asymmetry that is generally present in the preferred applications, is that the valve assembly preferably operates to affect the flow of displaced fluid in one direction, and may be operated to further restrict flow when the piston displacement is driven toward its end of travel in the housing. This condition especially arises, in the case of a vehicle shock absorber, along the direction experiencing roadway impact impulses, rather than the direction of spring return motion that generally occurs after some damping of the initial impulse, and is subjected to lower maximum forces exerted over potentially longer time intervals. However, even in that context, as noted above the invention contemplates that the bypass assembly of the invention may include a further valve mechanism, or more than one such mechanism, to dampen either one or both directions of displacement. Such operation will be more readily understood from the detailed discussion below.

Figure 2:
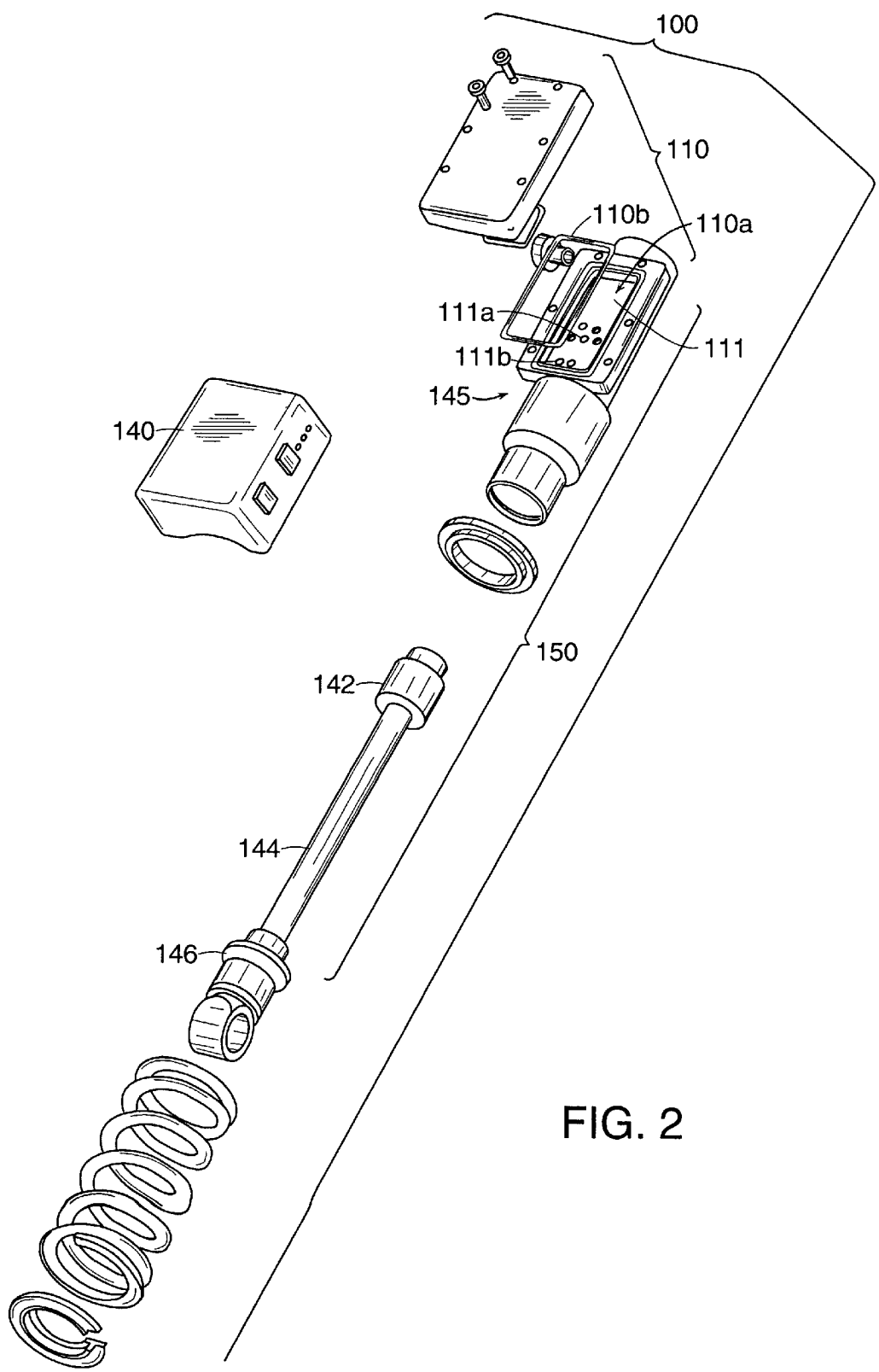
FIGS. 2 and 2A show exploded views of a third embodiment of the present invention implemented in a shock absorber.

FIG. 2 shows an exploded perspective view of a damper valve 100 of the present invention incorporated in a bicycle shock absorber. The valve includes a controlled return assembly 110 which is mounted to a fluid displacing assembly 150. The fluid displacing assembly has the overall structure of a bidirectionally movable hydraulic piston/cylinder assembly, including a piston 142 mounted on a shaft 144 and reciprocable within a fluid housing 145. An end cap 146 secures the piston/shaft to the housing 145 and seals about the shaft, and the piston itself divides the housing into upper and lower chambers. A lateral surface region 110a of the housing 145 is configured for sealing attachment to the valve 110, and has a surface 111 with passages 111a, 111b opening to the interior of the fluid housing. The passages 111a extend from the surface 111 to the interior of the housing 145 above the piston 142, while the passages 111b enter at a level generally lower than the normal position of the piston. Thus fluid will be driven from the cylinder through the passages 111a or 111b depending on whether the piston 142 moves upward or downward.

In this embodiment, the valve assembly 110 sealingly fits over the surface 111 and is clamped down with a gasket 110b to maintain the assembly sealed. An electrical controller 140 connects to the valve 110 and provides control signals to affect its operation, described further below. Within the assembly 110, shown in greater detail in FIG. 2A, an aperture plate 130 separates the passages 111a extending to the first chamber from those extending to the second chamber, and a piezoelectric member varies flow characteristics through the aperture to alter and preferably dynamically control the damping achieved by the assembly.

Figure 2A:
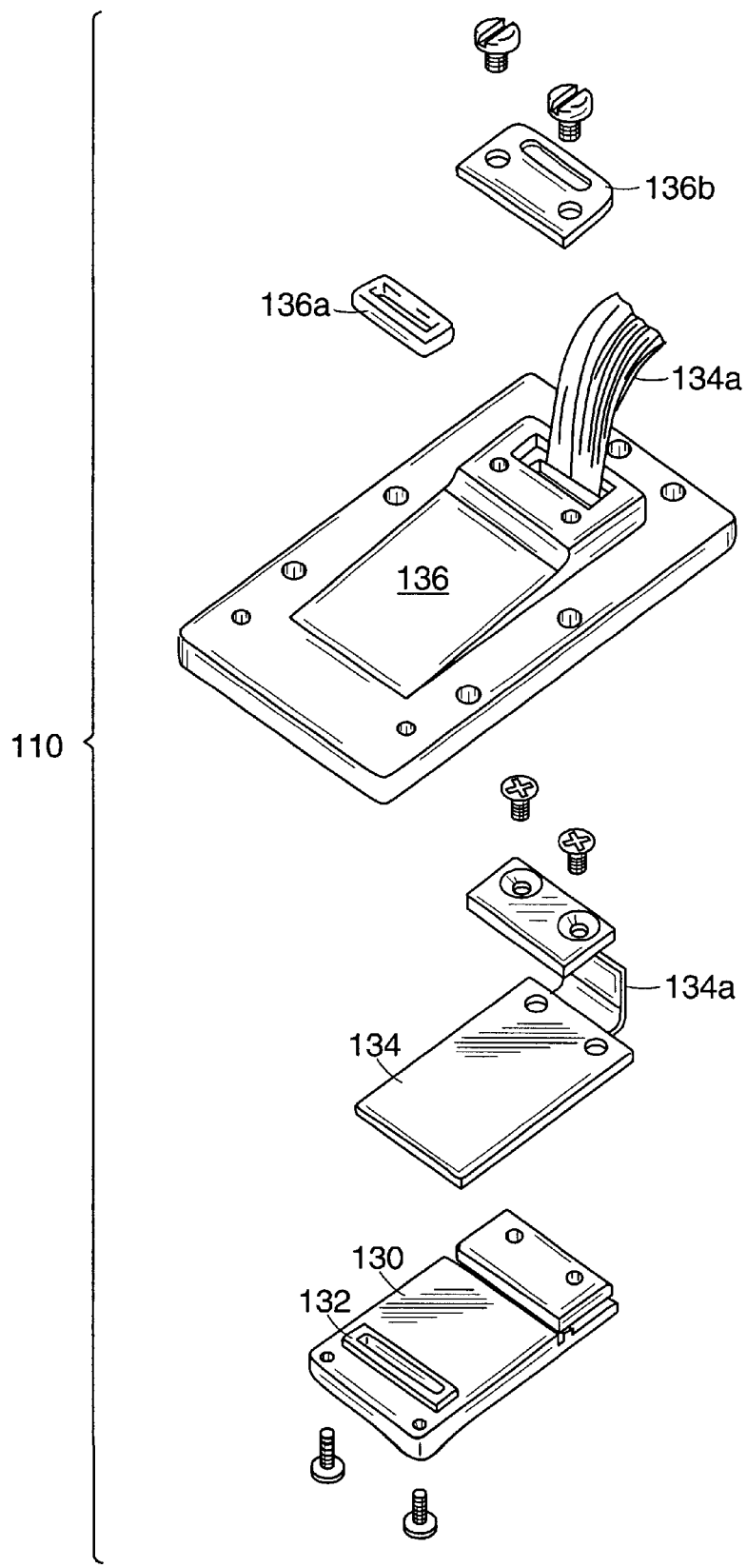

As shown in FIG. 2A, the valve assembly 110 includes a lower aperture plate 130 having an aperture 132 therein and the blocking member 134 having a flexible conductor or lead in 134a, such as a ribbon connector, extending therefrom to the controller 140 to electrically actuate the member 134 and control its blocking force or position over the aperture 132. The lower aperture plate 130 has an area smaller than the total surface 111, and is fitted against that surface with a gasket 110b (FIG. 2) so as to entirely cover the first set of passages 111a without covering the passages 111b. Fluid exiting the passages 111a must therefore pass through the aperture 132 to reach the passages 111b. Above the blocking member 134, which is shown as a cantilevered piezoelectric bending sheet, a cover plate 136 encloses the second side of the aperture plate, and assures that fluid exiting aperture 132 is forced through passages 111b. A seal ring 136a fits around the conductor ribbon 134a of the piezoelectric actuating member, to provide a seal where the conductor exits the housing of the valve assembly 1110, and a clamp plate 136b compresses the seal over the electrical passage. The flexible conductor is attached to the controller 140 (FIG. 2). Thus, the valve forms a bolt-on assembly over a shock absorber to provide electrically controlled and variable damping of the fluid flow between chambers of the shock absorber. It will be understood that since the blocking member 134 is suspended on the outflow side of aperture 132, it will allow passage of high pressure fluid from the upper to the lower chamber, but will be urged more tightly in contact with the aperture by the reverse pressure gradient and therefore block return flow from the lower to the upper chamber. Thus, it serves to variably damp motion of the shock absorber in one direction, allowing a stiffer or softer motion. Such actuation alone would, of course, result in the shock absorber moving in one direction and locking up at the end of its travel. Thus, it is understood that further passages for return of fluid are provided.

The return passages may be of similar operation, or may be fixed passages of conventional type, in which case only the damping in one direction is electrically varied. In the prior art as noted above, communication between chambers is accomplished by having two sets of one-way apertures, for example, flap-covered valves or flow restrictor passages in the piston head itself as shown in FIG. 1B. Each set of apertures allows a restricted damped fluid flow from one side to the other, and the number and areas of the apertures, as well as the restrictions provided by the flap covers, are selected to assure that the energy required to move the piston in each of the two directions is appropriate for the desired level of damping. These prior art damping passages each have fixed flow characteristics set by their mechanical structures. By contrast, the blocking member 134 and aperture 132 provide an electrically varied damping bypass, whose characteristics are changed by the controller by application of different electrical signals. The bypass may thus soften the fixed stiffness provided by the prior art construction. The exact size or degree of restriction applied to the aperture 132 will vary depending on measured or intended conditions, and is controlled by the controller 130.

The controller 130 may operate as a simple electrical switch which applies one of several, illustratively three different control signals across the blocking member 134 to switch it between different biased positions over the aperture. These may include a zero-voltage or mechanically-biased state, and two states to drive on or the other piezo element of the bimorph bender to enhance or decrease the blocking force. In accordance with this aspect of the invention, the blocking member 134 is preferably mechanically mounted to bear against the aperture 132 in its neutral or electrically unactuated state, so that it serves as a plate cantilevered over the opening. The member 134 is a preferably a piezoelectric bimorph constructed as shown, for example, in commonly-owned U.S. patent application Ser. No. 08/188,145 filed on Sep. 10, 1996, or is otherwise built to achieve a stiff member that develops a high actuation force in a short time, and to reside in the fluid and resist cracking and electrode failure. Thus, when a voltage of one polarity and magnitude, illustratively between about ten and several hundred volts, is applied to the blocking member 134, it deflects and bends toward the aperture, increasing its bias force. When the controller applies a different signal, the blocking member 134 moves away or is urged in the opposite sense, decreasing its bias force and allowing the passage 132 to open more easily, at lower pressures, and to open wider, thus permitting greater amounts of fluid through per unit time. The aperture may have a relatively small area, between several square millimeters and about one square centimeter, so despite the relatively high pressures which may arise, the piezo actuation forces are sufficient to significantly resist opening of the valve and substantially alter the flow through the aperture once it has opened. This is because when the stiff but flexible piezo plate is pushed aside by the fluid pressure, the blocking member moves in the near field of fluid flow to still exert frictional drag on the moving fluid. At the relatively small gaps involved, and with flow interacting with the larger areas of the actuator sheet, fluid control forces are significant. Furthermore, the closing force is substantial, typically between about 0.1 and 1.0 pounds.

Preferably, the controller is powered by a simple and light weight dry cell battery, such as a nine volt battery of small size, which may further be a rechargeable cell. Voltage doubler circuits of solid state construction are preferably provided, and may be arranged in series as a charge ladder to increase the voltage to suitably high level, so that the piezo elements can be quickly switched between charge states and actuated in a relatively small time interval. For piezoelectric elements about ten to sixty mils thick, an actuation voltage of about two hundred to six hundred volts is used, and the response time of the actuator is shorter than the natural frequency of the vehicle suspension.

The controller in a further embodiment may receive a signal from a position sensor which detects the proximity of the piston to the top of the cylinder. Such a position sensor 125 is shown in FIG. 2. This may be implemented in one embodiment by forming the housing of non-magnetic material and providing ferritic or magnetic material in the piston head, and providing the sensor 125 as a magneto-resistive element located in the housing to detect in a continuous manner the distance to the piston head. In accordance with this aspect of the invention, the controller monitors the signal received from the position sensor, and determines the position of the piston in the chamber and/or the velocity or direction of piston movement. As noted above, in general a hard (stiff) or soft ride may be provided by actuating the member 26 with driving signals towards or away from the opening 20. The controller preferably monitors piston position to determine when substantial movement occurs. Normally a stiff (blocked) position is used for pedaling, switching to a softer damping position for road impacts. As piston position approaches the end-of-travel, the controller may again switch to further obstruct the opening. Thus, as the piston continues to move upward, the controller then increases the actuating signals to increase the blocking force applied by the member 134. This further restricts flow through the aperture and assures that the piston does not bottom out against the top of the chamber. However, when the piston is moving upward but has not approached the top of the chamber, the controller may apply a lesser signal, or no signal at all, or a reverse polarity signal, to allow less obstructed flow through the bypass and produce a relatively soft damping effect and smoother ride during the early stages of piston travel. The shock absorber therefore performs with greater comfort than it would if the suspension were fixedly made stiff enough for maximum pedaling efficiency, or soft enough for general purpose damping. Further, it may assure the piston does not mechanically contact the top or bottom of the cylinder.

The invention also contemplates constructions wherein the controller incorporates more complex detection mechanisms or software signal processing to determine piston speed, for example by computing the difference between successive positions, or piston acceleration, to recognize the severity of an impact before the piston has traveled too far, and to respond by increasing the damping during strong or abrupt piston strokes. Other sensors, such as a pressure sensor may alternatively be provided from which the controller determines the appropriate direction and magnitude of its blocking member control signal. In general velocity-indicated signals are derived by a simple processor-implemented differencing of the basic position or pressure values sensed by an indicator.

The invention further contemplates constructions wherein the passages between upper and lower chambers run through the piston head, and piezoelectric control members are mounted on the piston itself to variably restrict these flow passages. FIGS. 3A, 3B and 4A, 4B illustrate such embodiments. In each of these configurations, a piston has multiple passages extending through its heads, and the electroactive flow restrictor 26 is mounted, preferably concentrically on the shaft, and is deformed or actuated to vary the damping achieved by the passages. Electrical leads may be run through the shaft, or otherwise provided for energizing the piezo portions PZ. A support plate 26a may be used to limit travel and further define the aperture restriction geometry. The passages need not be cylindrical holes, but may be openings or passages of any shape adapted to be effectively obstructed by an electroactive sheet elements. Such shapes may include, for example, a slot-like passage of rectangular cross section, in which a bimorph sheet or actuator deforms to bend into the flow stream and obstruct the passage. Other passages or openings, and actuator shapes are also contemplated, and may be adapted to the particular range of pressures and rates of flow which are expected in use.

Thus, rather than a cantilevered sheet or plate having an end extending over a opening, a number of mechanical systems including pinned-pinned, clamped-pinned, clamped-sliding and other actuator mountings are envisaged for effectively obstructing flow through a passage, or through an orifice or aperture. Several such configurations are shown in FIGS. 5A–5I.

Figure 5A:
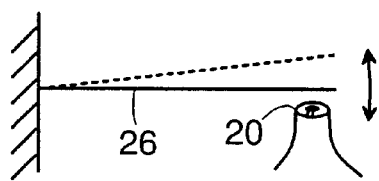
FIGS. 5A–5I illustrate further embodiments.
Figure 5B:
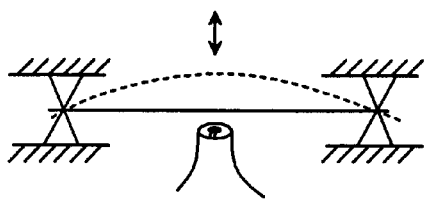
Figure 5C:
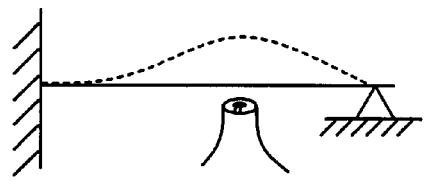
Figure 5D:
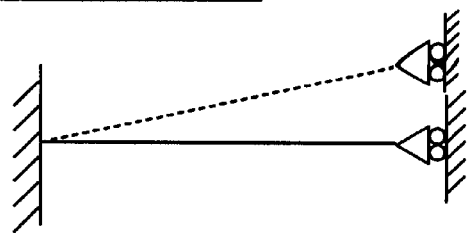
Figure 5E:
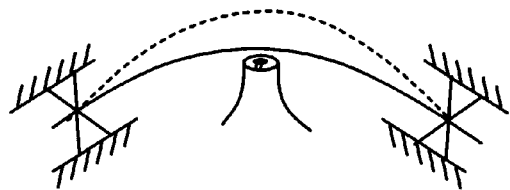
Figure 5F:
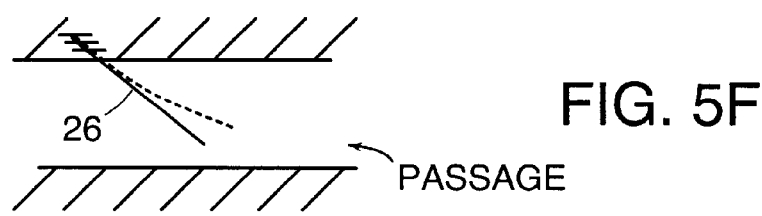
Figure 5G:
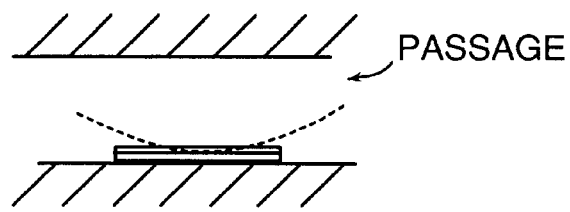
Figure 5H:
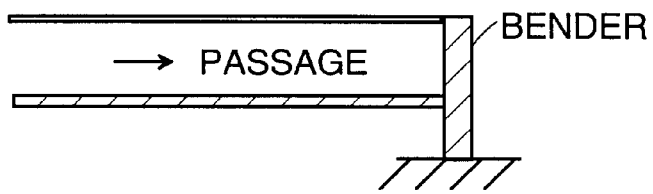
Figure 5I:
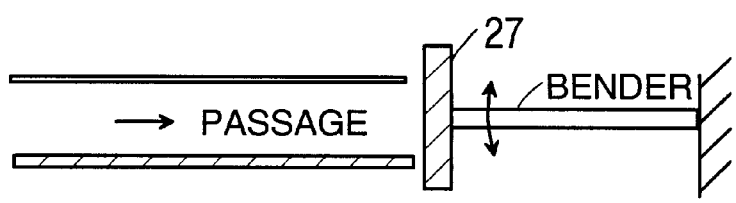

These FIGURES illustrate piezobenders in various mechanical configurations adapted for the damper of the present invention. The embodiment of FIG. 5A represents a cantilevered piezobender as shown in the earlier FIGURES, while FIG. 5B shows an embodiment pinned at both ends. Such a configuration achieves a higher blocking force at the nozzle or aperture. A pre-curved blocking element (FIG. 5E) may be employed to provide greater displacement, or faster overall response, while FIGS. 5F and 5G show obstructors in the flow passage itself. The electroactive element may also be positioned to move an obstructing body 27, as shown in FIG. 5I.

In addition to their specific actuation characteristics, one of these configurations may be selected to fit a particular housing or mechanical structure in which the flow damper is to be housed.

This completes the description of the basic embodiments and configurations of the present invention. The invention being thus disclosed and described, variations and modifications thereof will occur to those skilled in the art and all such variations and modifications are considered to be within the scope of the invention as defined in the claims appended hereto.

What is claimed is:

1. A damper for a hydraulic system of the type having a housing having a wall, a fluid assembly within said housing, and a movable displacing member having a first surface and a second surface in fluid communication with each other through a passage, the movable displacing member acting on the fluid assembly such that movement of the displacing member creates a pressure to induce fluid flow through the passage in accordance with force on the movable displacing member, said damper comprising:
    an aperture through the housing wall, and leading to the passage; and
    a blocking member comprising an electroactive material, and positioned to control flow through said aperture, and being configured with electrodes such that application of electrical charge to the electrodes deforms said blocking member to control said flow, thereby to regulate damping of the hydraulic system.

2. A damper according to claim 1, further including a controller for applying an electrical control signal to the electrodes to control said flow.

3. A damper according to claim 2, further including a sensor for sensing a state of said system and producing a sensing signal, and wherein the controller determines said electrical control signal in response to said sensing signal.

4. A damper for a hydraulic system of the tape having a movable displacing member that acts on a fluid assembly such that movement of the displacing member creates a pressure to induce flow through a passage in accordance with force on the movable displacing member, said damper comprising
    a flexible electroactive element positioned to control flow through the passage and being configured with at least one electrode such that application of electrical charge to the at least one electrode deforms said electroactive element to control said flow and regulate damping of the hydraulic system;
    a controller for applying an electrical control signal to at least one of the at least one electrode to control said flow; and
    a sensor for sensing a state of said system and producing a sensing signal,
    wherein the controller determines said electrical control signal in response to said sensing signal, and
    wherein said sensor senses pressure in said passage.

5. A damper according to claim 3, wherein said sensor determines a function of position of said movable displacing member.

6. A damper according to claim 2, further including a battery power source and a voltage multiplier for developing said electrical control signal.

7. A damper according to claim 2, wherein the controller includes a switch assembly for providing two distinct voltages to said electrodes to determine different damping characteristics.

8. A damper according to claim 1, wherein said passage is an elongated passage and the blocking member is a sheet piezobender mounted to variably occlude the passage.

9. A damper according to claim 1, wherein the movable displacing member is a push-pull piston assembly of a vehicle suspension.

10. A damper according to claim 9, wherein the damper is a bicycle suspension damper.

11. A damper according to claim 9, wherein the blocking member comprises a piezoelectric bimorph having a free edge extending over the passage.

12. A damper according to claim 9, wherein the passage includes a slot.

13. A damper according to claim 1, wherein said blocking member has a bias force or position that varies in accordance with said electrical charge.

14. A damper according to claim 1, wherein the blocking member is configured to be displaced by pressure of fluid at said passage.

15. A damper according to claim 14, wherein said electrical charge effectively varies maximum displacement of the blocking member occurring under influence of fluid flow through the aperture.

16. A damper according to claim 2, further comprising a sensor to detect a function of position of the displacing member and wherein the controller activates the blocking member in accordance with the detected function of position.

17. A damper according to claim 16, wherein the controller activates the blocking member to increase stiffness of the hydraulic system and prevent bottoming-out.

18. A damper according to claim 2, wherein the controller switches said control signal between a first signal level effective to provide soft damping and a second signal level to provide hard damping.

19. A damper in accordance with claim 1, wherein the aperture and blocking member are effective to variably block and therefore change flow along said passage in a first direction, while substantially completely blocking flow in a reverse direction.

20. A damper according to claim 2, wherein the passage is located in a piston and said electroactive element variably obstructs flow through the piston.

21. A damper according to claim 20, wherein the electroactive element and passage form a one way valve.

22. A damper according to claim 21, wherein the hydraulic system is a bicycle suspension and the controller applies a control signal effective to soften damping characteristics while preventing bottoming out.

23. A damper according to claim 22, wherein the hydraulic system is a bicycle suspension and the controller applies a control signal at a rate faster than natural frequency of the suspension.

24. A damper according to claim 21, wherein the hydraulic system is a bicycle suspension and the controller varies damping during individual cycles of movement of said suspension.

25. A bicycle shock absorber comprising:
    a hydraulic piston assembly having a housing wall, and a piston dividing a closed fluid body into upper and lower chambers an aperture through said housing wall leading to a flow passage between said upper and lower chambers, a flexible piezoelectric member positioned to deform by fluid pressure and move to control flow through the passage, and means for applying electrical energy to the piezoelectric member in accordance with a desired damping of piston movement.

26. The bicycle shock absorber of claim 25, further comprising a voltage multiplier circuit for raising voltage of a battery-powered source to a raised output voltage, and wherein the means for applying electrical energy applies the raised output voltage to the piezoelectric member.

27. The bicycle shock absorber of claim 25, wherein said means for applying electrical energy changes the voltage applied to the piezoelectric member in accordance with a detected condition of said shock absorber.

28. The bicycle shock absorber of claim 25, wherein said means for applying electrical energy applies the electrical energy in accordance with a microprocessor-selected control state.

29. A damper for a hydraulic system of the type having a housing having a wall, a fluid assembly within said housing, and a movable displacing member having a first surface and a second surface in fluid communication with each other through a passage, the movable displacing member acting on the fluid assembly such that movement of the displacing member creates a pressure to induce fluid flow through a passage in accordance with force on the movable displacing member, said damper comprising:

an aperture through the housing wall, and leading to the passage; and a flexible electroactive element positioned to variably occlude said aperture and configured with electrodes, wherein the pressure caused by the movement of the displacing member causes said flexible electroactive element to move such that said passage is at least partially opened; and wherein application of electrical charge to the electrodes deforms said electroactive element, thereby to control said flow and regulate damping of the hydraulic system.

\* \* \* \* \*